(12) United States Patent (10) Patent No.: US 7,525,766 B2
Tani (45) Date of Patent: Apr. 28, 2009

(54) MAGNETIC HEAD SLIDER WITH GROOVE FORMED IN REDUCED-WIDTH PORTION OF TRAILING PAD BETWEEN HEAD AND TRAILING EDGE

(75) Inventor: Hiroshi Tani, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 419 days.

(21) Appl. No.: 11/060,847

(22) Filed: Feb. 18, 2005

(65) Prior Publication Data

US 2005/0185342 A1 Aug. 25, 2005

(30) Foreign Application Priority Data

Feb. 19, 2004 (JP) ............................. 2004-042580

(51) Int. Cl.
*G11B 5/60* (2006.01)
*G11B 17/32* (2006.01)
(52) U.S. Cl. ................ 360/235.7; 360/235.8; 360/236.3
(58) Field of Classification Search ............. 360/236.5, 360/235.7, 236.7, 237, 236.3, 235.8, 236.6, 360/235.4, 235.5, 235.6
See application file for complete search history.

(56) References Cited

U.S. PATENT DOCUMENTS

| 4,081,846 | A | * | 3/1978 | Roscamp et al. | 360/236.5 |
|---|---|---|---|---|---|
| 4,375,656 | A | * | 3/1983 | Radman, Jr. et al. | 360/235.4 |
| 5,270,889 | A | * | 12/1993 | Muratomi | 360/246.2 |
| 5,473,486 | A | * | 12/1995 | Nepela et al. | 360/236.5 |
| 5,634,259 | A | * | 6/1997 | Sone et al. | 29/603.12 |
| 5,751,517 | A | * | 5/1998 | Agarwal | 360/235.4 |
| 5,825,587 | A | * | 10/1998 | Bolasna et al. | 360/236.5 |
| 5,978,176 | A | * | 11/1999 | Ezaki et al. | 360/236.5 |
| 6,040,965 | A | * | 3/2000 | Terunuma et al. | 360/236.5 |
| 6,198,600 | B1 | * | 3/2001 | Kitao et al. | 360/236.5 |
| 6,301,079 | B1 | * | 10/2001 | Hanamoto et al. | 360/236.5 |
| 6,421,205 | B1 | * | 7/2002 | Dorius et al. | 360/236.5 |
| 6,466,410 | B2 | * | 10/2002 | Polycarpou et al. | 360/236.6 |
| 7,233,459 | B2 | * | 6/2007 | Zhu | 360/235.7 |
| 2001/0030834 | A1 | * | 10/2001 | Kohira et al. | 360/235.8 |
| 2002/0089788 | A1 | * | 7/2002 | Baumgart et al. | 360/235.7 |
| 2002/0191341 | A1 | * | 12/2002 | Kohira et al. | 360/235.8 |
| 2005/0157426 | A1 | * | 7/2005 | Musashi et al. | 360/235.7 |

FOREIGN PATENT DOCUMENTS

JP 04366408 A * 12/1992
JP 05-006506 1/1993

(Continued)

*Primary Examiner*—Craig A Renner
(74) *Attorney, Agent, or Firm*—Townsend and Townsend and Crew LLP; Rambod Nader (57) ABSTRACT

In one embodiment, the slider surface comprises an inflow shallow groove part formed in a stepped manner, two inflow end pads, a negative pressure generating deep groove part, an outflow shallow deep groove part formed on the air outflow end side, an outflow end pad provided on the outflow shallow groove part, and a trimmed part (flying height reducing portion) in which the outflow end pad is extended to the air outflow end while being narrowed in width. A magnetic head is formed on the trimmed part on the outflow side of the outflow end pad, and the trimmed part between the magnetic head and the outflow end is formed with a groove portion in the air outflow direction.

18 Claims, 7 Drawing Sheets

FOREIGN PATENT DOCUMENTS

| | | | |
|---|---|---|---|
| JP | 08255329 A * | 10/1996 | |
| JP | 09-102102 | 4/1997 | |
| JP | 10-293983 | 11/1998 | |
| JP | 2000-260015 | 9/2000 | |
| JP | 2002-343049 | 11/2002 | |
| JP | 2003-099910 | 4/2003 | |
| WO | WO 2004061828 A1 * | 7/2004 | |

* cited by examiner

MAGNETIC HEAD SLIDER WITH GROOVE FORMED IN REDUCED-WIDTH PORTION OF TRAILING PAD BETWEEN HEAD AND TRAILING EDGE

CROSS-REFERENCES TO RELATED APPLICATIONS

This application claims priority from Japanese Patent Application No. JP2004-042580, filed Feb. 19, 2004, the entire disclosure of which is incorporated herein by reference.

BACKGROUND OF THE INVENTION

The present invention relates to a shape of an air bearing surface of a magnetic head slider suitable for achieving the high recording density, and particularly to the surface shapes of a flow-out end rail or pad forming an air bearing surface.

The magnetic head slider is generally a slider which is provided with a pad type air bearing surface shape and includes a magnetic head element for write and read in an outflow end pad. Recently, it has become an essential problem to reduce a flying height of a magnetic head slider in order to enhance the recording density. Therefore, it is inevitably demanded to reduce the surface roughness of a magnetic disk. However, in recent years, the flying height of the magnetic head slider has remarkably been decreased, and when the magnetic head slider and the magnetic disk come in contact with each other due to the disturbance or the use at high high-power, a large frictional force is generated because the surface roughness of the magnetic disk is small. Thus, in some cases, the magnetic head slider vibrates to disable the magnetic head element from reading and writing.

Japanese Patent Laid-open No. 10-293983 discloses a method for reducing a frictional force by forming a projection, on a rail surface of a slider, having a polygonal or circular groove in the surface opposite to the medium. Japanese Patent Laid-open No. 2000-260015 discloses a method for reducing a frictional force by forming a very small projection on an inflow pad of a slider. Further, Japanese Patent Laid-open No. 2003-99910 discloses a technique for achieving a lower floating height of a head and lower frictional force by forming an intermediate step around an outflow pad to prevent the lubricant accumulated on a slider from moving to the slider surface of the outflow pad. As regards the lower floating height, Japanese Patent Laid-open No. 2002-343049 discloses a technique for increasing a negative pressure force and lowering a floating height of a slider by mounting a movable section, which is able to expand and contract in the height direction of the slider, at the air outflow end of the negative pressure slider, the movable section being approximately flush with the negative pressure groove surface at the time of writing and reading.

BRIEF SUMMARY OF THE INVENTION

In the above-described art, when the flying height of the magnetic head slider lowers, the lubricant on the surface of the magnetic disk comes into contact with the slider, and even if the surface roughness of the magnetic disk surface is made small, the flying height (contact starting flying height) at which the slider starts to contact with the disk does not depend upon the surface roughness. That is, even if the surface roughness of the disk is made small, the contact starting flying height is not made small, and therefore, it is difficult to reduce the flying height of the slider.

The present inventor has grappled with the above-described phenomenon to elucidate the mechanism thereof, resulting in the following inference. The surface roughness of the magnetic disk is normally about 0.3 to 0.6 nm in average surface roughness Ra, and the projecting height Rb is about 1.5 to 3 nm. The thickness of the lubricant coated on the disk is about 1 to 2 nm. Since the lubricant is liquid, it is also transferred to the head slider surface, and it is presumed that the thickness will easily assume about 1 to 2 nm in the slider surface. When under these circumstances, the head slider flies with the flying height almost touching the magnetic disk surface, the lubricant on the slider surface comes in contact with the lubricant on the disk surface. At this time, in the case where the disk has a large surface roughness, since a meniscus area of the lubricant is small, the frictional force is small, and the vibrations of the slider are not excited. On the other hand, in the case of small surface roughness, the meniscus area is large and therefore the frictional force is large, whereby vibrations of the slider are excited. Consequently, the large contact starting flying height is measured, whereas the surface roughness is small.

Further, another mechanism can be presumed as described below. When the magnetic disk comes in contact with the head slider, the thickness of the lubricant in the contact interface therebetween is about 2 to 4 nm, but the lubricant is about to be extruded from the contact interface. Where the roughness of the disk surface is large, lubricant moves in grooves appearing in the roughness. Where the roughness is small, there is no place where the lubricant moves, which impedes the flying of the slider. As mentioned above, it is probable that the contact starting flying height is not lowered with the reduction of the surface roughness.

It is a feature of the present invention to provide a magnetic head slider having a slider surface shape capable of reducing a flying height.

To solve the above-described problem, it is desirable to provide a magnetic head slider having the construction in which even if contacted with a magnetic recording medium on the super-smooth surface, the frictional force is small, the head is not vibrated, and the lubricant tends to be discharged from the contact interface in which the slider and the disk come into contact.

A magnetic head slider according to an aspect of the present invention comprises an inflow shallow groove part provided on a surface facing a medium; a plurality of air bearing rails or pads for generating an air bearing force, provided on the surface facing the medium; and a magnetic head provided in an air bearing rail or pad, of the air bearing rails or pads, on a side of an air outflow end; wherein an area in which a groove portion extending in an air outflow direction of the air bearing rail or pad is formed closest to the surface facing the medium is provided between the magnetic head and the air outflow end.

In some embodiments, the area in which the groove portion is formed is provided such that the air bearing rail or pad on a side of the air outflow end is extended to the air outflow end. The width of the region in which the groove portion is formed is narrower than the width of the air bearing rail or pad on the side of the air outflow end. The depth of a groove formed in the groove portion is not less than 5 nm. The groove formed in the groove portion is linear.

In specific embodiments, the width of a projection between a plurality of grooves formed in the groove portion is not more than 10 μm. The depth of a plurality of grooves formed in the groove portion is not less than 5 nm, and the width of a projection between the grooves is not more than 10 μm. The groove formed in the groove portion may be a circular arc or a triangle.

In accordance with another aspect of the present invention, a magnetic head slider comprises a slider including a tapered or stepped part formed at an air inflow end on a surface facing a medium; an inflow end rail or pad formed on a side of the air outflow end away from the tapered or stepped part; a negative pressure generating groove formed on the side of the air outflow end away from the inflow end rail or pad; and an outflow end rail or pad formed on the side of the air outflow end; and a magnetic head provided in the outflow end rail or pad of the slider; and a flying height reducing portion formed with a groove extending along an air outflow direction provided between the magnetic head and the air outflow end of the slider.

In some embodiments, the flying height reducing portion is formed such that the outflow end rail or pad is extended to the air outflow end. The width of the flying height reducing portion is narrower than that of the outflow end rail or pad.

According to the present invention, it is possible to provide a magnetic head slider having a slider surface shape capable of reducing a flying height.

DETAILED DESCRIPTION OF THE INVENTION

Figure 1:
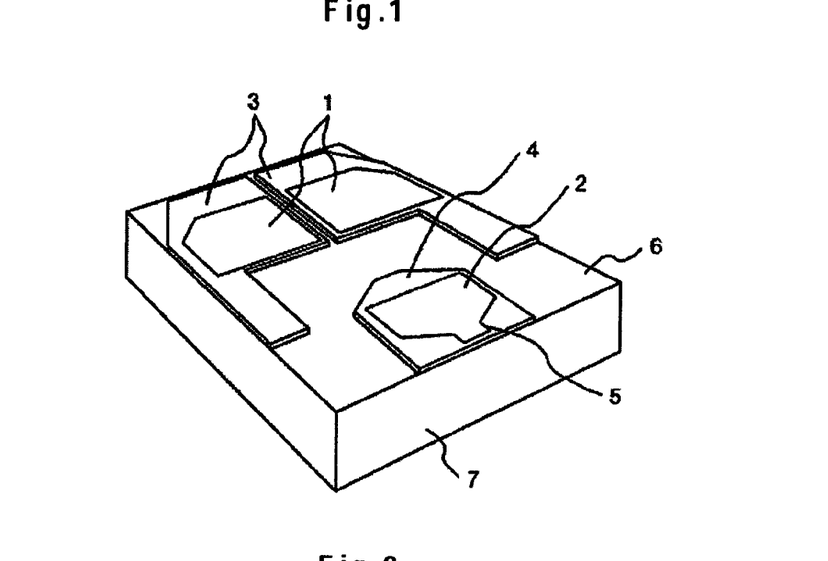
FIG. 1 is a perspective view showing a slider surface of a magnetic head slider to which the present invention is applied.

The present invention will be described in detail on the basis of embodiments. FIG. 1 shows one example of a shape of a magnetic head slider to which the present invention is applied. The magnetic head slider is formed by forming a magnetic head element on a wafer, and thereafter cutting it. The wafer is formed by sintering alumina, titanium, carbide or zirconia. On a slider surface (an air bearing surface or a surface opposite to a medium) are formed, although not shown, a silicone film having a thickness of about 1.5 nm and an air bearing surface protective film 10 (see FIG. 3) having a diamond like carbon film having a thickness of about 5 nm laminated thereon. The slider surface comprises an inflow shallow groove part 3, with a tapered or stepped part, formed at an air inflow end; two inflow end rails or pads 1 extending from the inflow shallow groove part 3 to the air outflow side; a negative pressure generating deep groove part 6 formed at the rear of the inflow end rails or pads 1; an outflow shallow groove part 4 formed on the air outflow end side; outflow end rails or pads 2 provided on the outflow shallow groove part 4; and a trimmed part (a flying height reducing portion) 5 in which the outflow end rails or pads 2 are extended to an air outflow end 7 while being narrowed in width. The flying height reducing portion 5 is a part closest to a magnetic recording medium.

Figure 2:
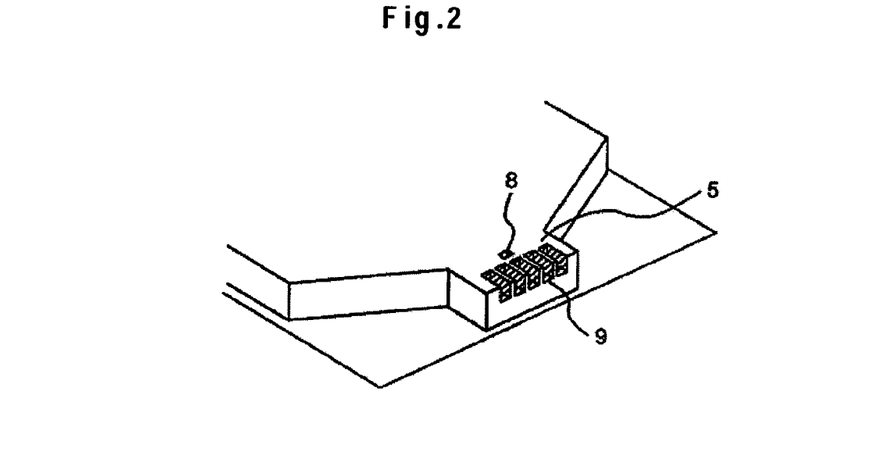
FIG. 2 is a perspective view showing a surface of an outflow end pad of a magnetic head slider according to an embodiment of the present invention.

Next, FIG. 2 shows an embodiment of the present invention. Here, the air bearing surface protective film is omitted. A magnetic head 8 is formed on a flying height reducing portion 5 on the outflow side of an outflow end pad 2. In addition, the flying height reducing portion is provided with a groove-processed portion 9 extending in the air outflow direction at a portion between the magnetic head 8 and the outflow end. The groove processed portion 9 is formed by the ion beam process. The groove processed portion terminates at the outflow end. The groove processed portion 9 can be processed by not only the ion beam process but also the photolithography or laser.

The magnetic head 8 comprises a write element for recording and a read element for reproduction. The write element and the read element are formed by the photolithography in an alumina film on a wafer while the slider is the wafer. Next, a positional relationship when the magnetic head slider and the magnetic disk are in contact with each other will be described referring to FIG. 3.

Figure 3:
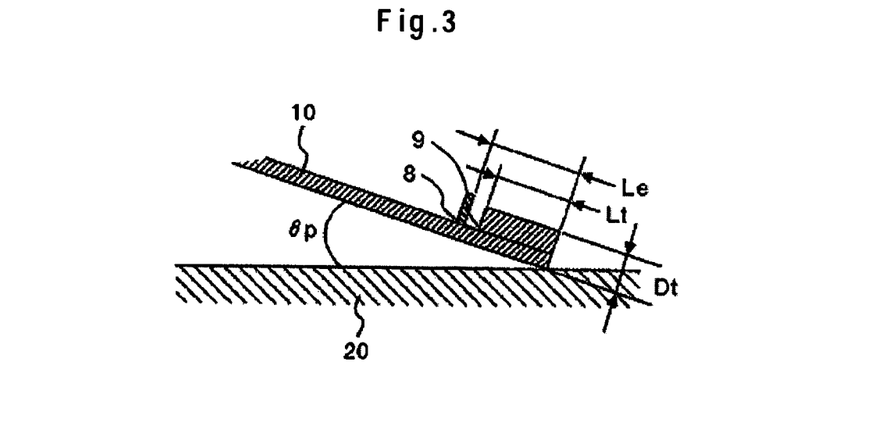
FIG. 3 is a side view showing a positional relation when a magnetic head slider and a magnetic disk come in contact with each other according to the embodiment of the present invention.

The magnetic head slider comes in contact with a magnetic disk 20 at a pitch angle θp. At this time, it comes in contact with the magnetic disk 20 at the groove processed portion 9. Let Le be the distance from the magnetic head 8 to the outflow end, and Lt be the length of the groove processed portion, Lt<Le is necessary. Considering the positional accuracy of processing, preferably, a position of the magnetic head element is spaced from a position of the groove processed portion by a few μm or more. Further, it is not preferable that Lt is too small, and about 2 μm is preferable. A too large pitch angle θp is not preferable since the flying height of the head element position becomes large. Also a too small pitch angle θp is not preferable since it is highly probable that the grooves 9 will not come in contact with the magnetic disk 20. In other word, the pitch angle has the optimum angle, which angle ranges from about 30 μrad to 100 μrad. If the depth Dt of the groove processed portion 9 is too small, there is no effect, and if too large, the groove processed portion 9 interferes with a head element structure, which is not preferable.

The magnetic disk 20 is formed by a Ni alloy based seed layer on a glass substrate, forming a Cr alloy based underlying film and a Co alloy based magnetic film by the sputtering, forming a diamond like carbon film having a thickness of about 3 nm thereon, and applying perfluoropolyether called tetrazole made by Sorpaysoreksis on the surface thereof by the dipping method. The surface roughness of the magnetic disk 20 is measured by an atomic force microscope (AFM) and the kind of the substrate is changed to prepare the substrates having projecting heights Rp of about 1 to 4 nm.

Figure 4:
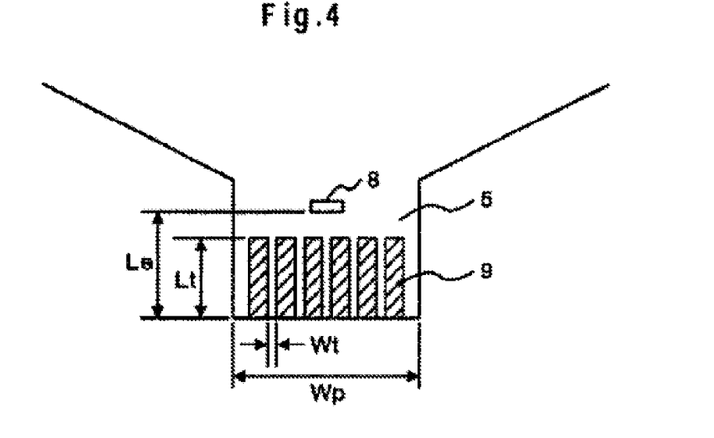
FIG. 4 is a plan view of the outflow end pad shown in FIG. 2.

FIG. 4 is a plan view of a slider surface. Let Wt be the width of a projection formed between grooves of the groove portion 9, and Wp be the width of the outflow end of the trimmed region (flying height reducing portion). For both Wt and Wp, it is necessary to optimize the dimensions thereof in order to obtain the predetermined characteristics thereof. First, the groove portion is formed as shown in FIG. 4. The width Wt of the projection is 2 nm, the number of grooves is 8, the length Lt of the grooves is 10 μm, a distance Le from the element position to the outflow end is 15 μm, the trimming width Wp is 60 μm, and the groove depth Dt is 30 μm. The dimensions of the slider are, in pico size, the width 1.0 mm, the length 1.25 nm, and the load 30 mN.

Figure 5:
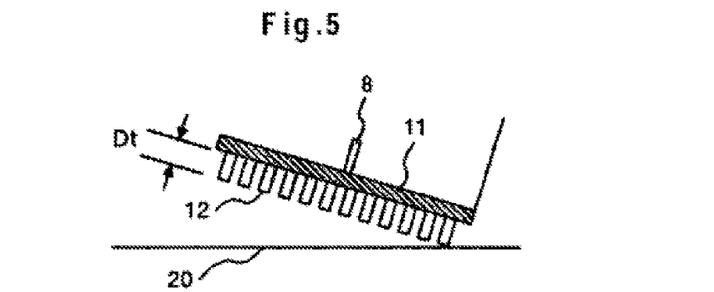
FIG. 5 is a schematic view showing Comparative Example 1.

Four kinds of head sliders were prepared as comparative examples. FIG. 5 is a schematic view of Comparative Example 1. In Comparative Example 1, a carbon protective film 11 is formed on the whole surface of the slider surface, and thereafter, a concave-convex 12 having a groove depth Dt of 10 nm is formed on the carbon protective film 11 by photolithography.

Figure 6:
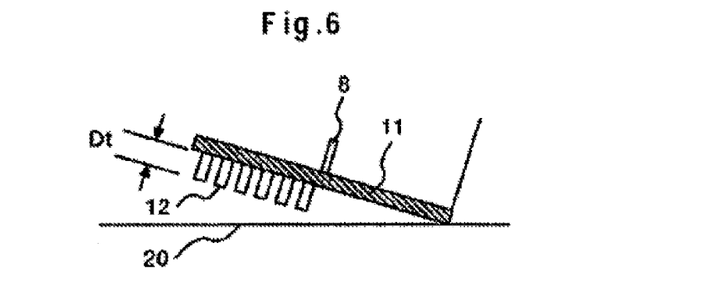
FIG. 6 is a schematic view showing Comparative Example 2.

Next, FIG. 6 is a schematic view of Comparative Example 2. In Comparative Example 2, a concave-convex 12 having a groove depth Dt of 10 nm is formed on a carbon protective film 11 on the inflow side of a magnetic head 8.

Figure 7:
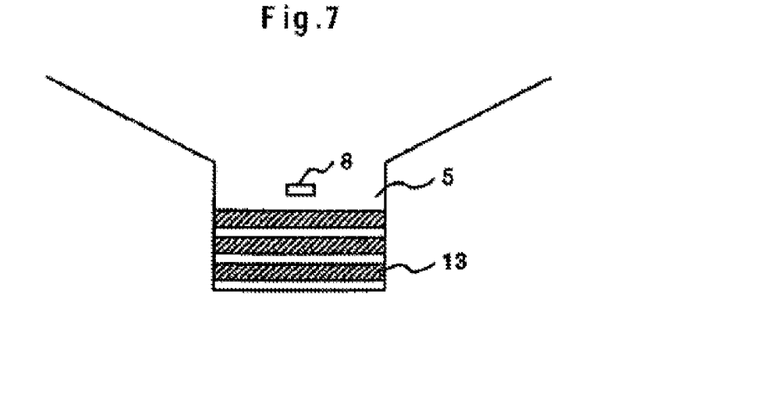
FIG. 7 is a schematic view showing Comparative Example 3.

Next, FIG. 7 is a schematic view of Comparative Example 3. Comparative Example 3 is a slider in which a groove portion 13 extending in a direction perpendicular to an advancing direction of the slider is formed on the outflow end side at the rear of a magnetic head 8. A depth DT of the grooves is 30 nm.

Comparative Example 4 is a slider without a groove portion in FIG. 7.

Figure 8:
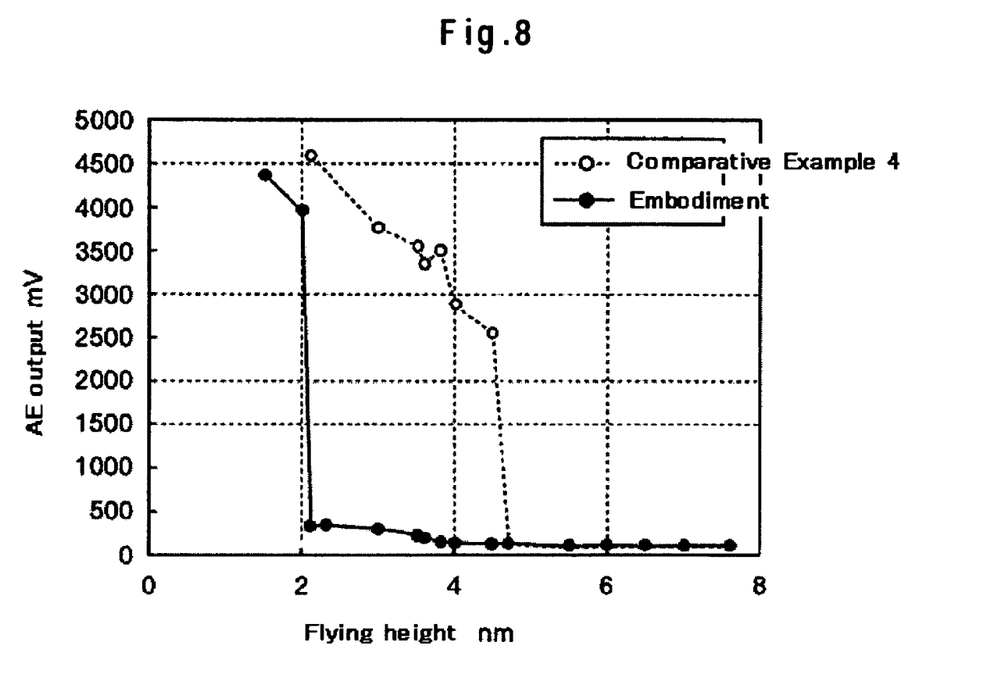
FIG. 8 is a diagram showing a relationship between a flying height and AE output of a magnetic head slider when environmental atmospheric pressure is lowered.

First, to compare the embodiment with Comparative Example 4, an acoustic emission (AE) signal from the magnetic head slider was measured when an environmental atmospheric pressure was lowered, with the magnetic head slider allowed to fly above the magnetic disk. FIG. 8 shows its results. As the atmospheric pressure is lowered, the flying height lowers, and finally the magnetic head slider comes into contact with the magnetic disk to make the AE signal high. FIG. 8 shows the relationship between the lowest flying height taken on the horizontal axis and the AE output taken on the vertical axis. In Comparative Example 4, at about 4.7 nm of the lowest flying height, the slider starts to contact with the disk and the AE signal increases rapidly. By contrast, in the present embodiment, the slider starts to contact with the disk at a lowest flying height of 2 nm. It is thus understood that the contact start flying height of the present embodiment is improved by 2 nm or more as compared with Comparative Example 4. Incidentally, the magnetic disk substrate having a projection height Rp of about 0.8 nm was used.

Figure 9:
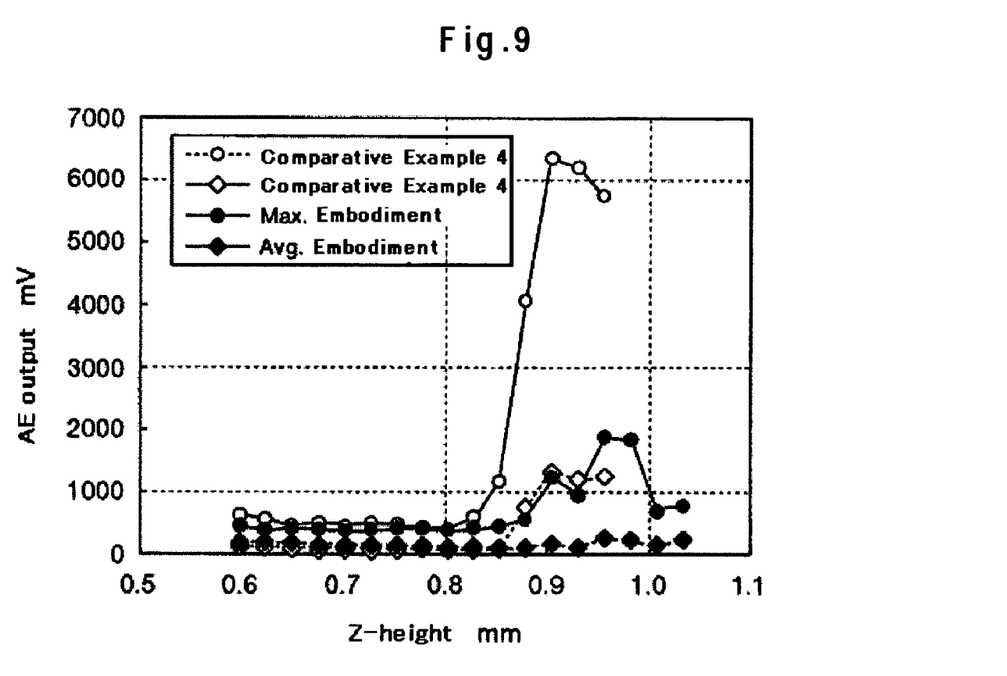
FIG. 9 is a diagram showing a relationship between a mounting height (Z-height) and AE output of the magnetic head slider.

Next, FIG. 9 shows the measurements of AE signal variations obtained when a Z-height, i.e., a mounting height of the magnetic head slider is gradually increased. The Z-height is the height from the magnetic disk to a mounting portion of the gimbals of a magnetic head slider. When the Z-height is gradually increased, the pitch angle θp is increased, and finally the slider comes into contact with the magnetic disk at the outflow end thereof. In Comparative Example 4, when the Z-height is 0.9 nm, the AE signal output is the maximum. At this time, the maximum value of the AE signal output is about four times that of the embodiment. Since it is considered that the AE signal output is proportional to vibrations caused by the frictional force of the slider, the results show that the use of the technique of the present invention makes it possible to reduce the frictional force.

Figure 10:
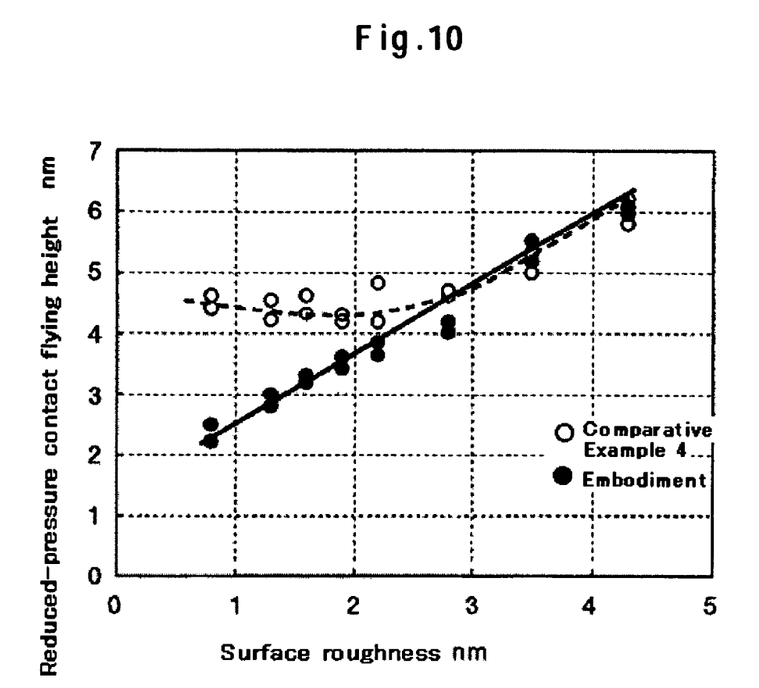
FIG. 10 is a diagram showing a relationship between substrate roughness of a magnetic disk and contact start flying height of a magnetic head slider.

Next, the magnetic head sliders of the present embodiment and Comparative Example 4 were used, and the contact start flying height was measured with the substrate roughness of the magnetic disk being as a parameter. The result is shown in FIG. 10. The substrate roughness is represented by an average projection height Rp obtained when an area of 5 μm square was measured ten times. The contact start flying height of Comparative Example 4 does not depend upon the substrate surface roughness Rp in areas whose Rp values are not more than 3 nm. By contrast, in the embodiment, as the base plate surface roughness Rp lowers, the contact start flying height lowers. Comparative Example 4 and the present embodiment are different in the contact start flying height by about 2.5 nm when the magnetic disk has 1 nm in substrate surface roughness Rp. This 2.5 nm corresponds to about 30% of the nominal flying height of the magnetic head slider, which is 8 nm. This demonstrates the remarkably enhanced characteristic.

It has been found from the above results that the magnetic head slider according to the embodiment of the present invention is combined with a magnetic disk having a lower surface roughness, thereby enabling further reduction of the head flying height. Moreover, this result indicates the possibility that even the reduction in surface roughness of the slider surface or the reduction in fine undulation of the disk surface makes it possible to reduce the contact start flying height. It is unclear that the above result is due to the fact that the frictional force when the magnetic head slider of the present embodiment is in contact can be reduced as described in the paragraph of "Problem to be Solve by the Invention," or the fact that it is less likely to be affected by the thickness of the lubricant. However, it first becomes clear in the present invention that the head flying height can be reduced.

Figure 11:
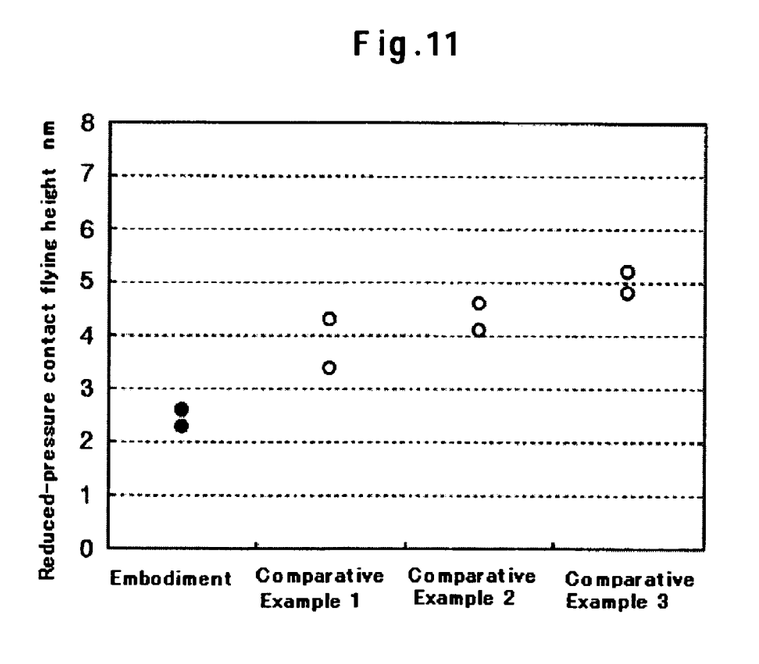
FIG. 11 is a diagram showing the results obtained by measuring the contact start flying height of the embodiment and Comparative Examples 1 to 3.

Next, FIG. 11 shows the measurements of the contact start flying height in the magnetic head sliders in the present embodiment and Comparative Examples 1 to 3. All Comparative Examples 1 to 3 are larger in contact flying height than the present embodiment. In Comparative Example 1, it is considered that since the concavo-convexes are formed in the whole slider surface, the frictional force is large, but it is considered that since the flying height of the slider is effectively lowered, the contact flying height increases. In Comparative Example 2, since the concavo-convexes are formed on the slider surface on the inflow side from the magnetic head element, the surface in contact with the magnetic disk will be an outflow end pad. Therefore, this will be substantially the same as Comparative Example 4, and the contact flying height is larger than that in the present embodiment. In Comparative Example 3, since the groove portion is formed in the direction vertical to the length direction of the slider, Comparative Example 3 is the same as Comparative Example 4 in terms of the contact point of the outflow end, that is, in terms of the case where the groove portion is not formed in the length direction of the slider. Consequently, there is no effect of reducing the contact start flying height. The comparison between the present embodiment and Comparative Example 3 shows that it is important that the groove portion has aeolotropy and the groove has aeolotropy with respect to the length direction (air outflow direction) which is the advancing direction of the slider.

Figure 12:
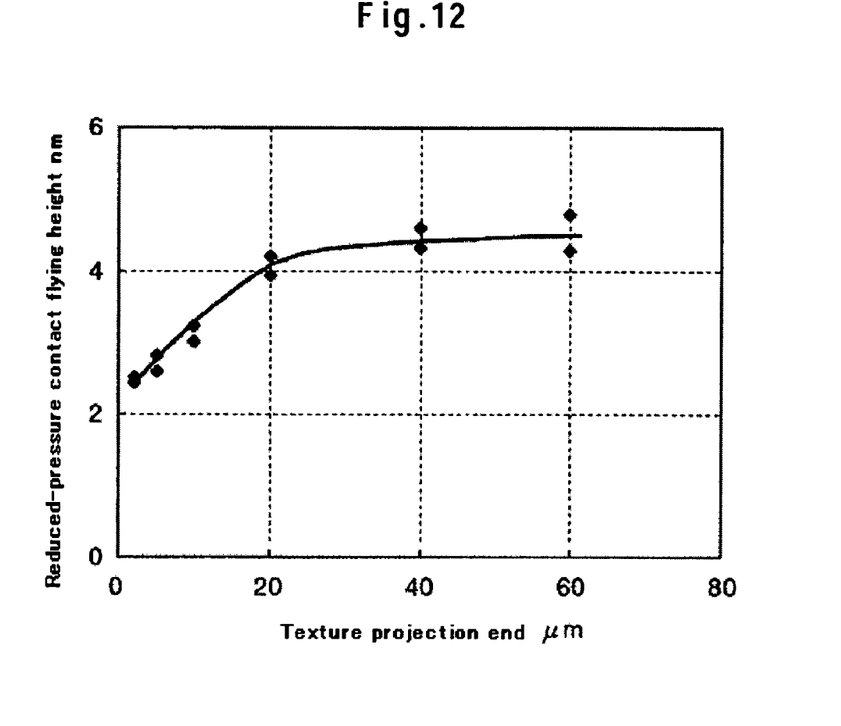
FIG. 12 is a diagram showing a relationship between the width of a projection portion (texture projection width) and the contact start flying height.

In the present embodiment, the width (texture projection width) of the projection of the groove portion 9 is about 2 μm. The frictional force reducing effect and the contact start flying height reducing effect are varied depending on the projection width. In view of this, the contact start flying height was measured while the projection width is varied. The combinations of the projection width/groove width and the number of projections are (2/4 μm, 7), (5/4 μm, 5), (10/44 μm, 3), (20/5 μm, 2), (40/5 μm, 1), and (0/0 μm, no groove portion: Comparative Example 4). FIG. 12 shows the results. As the projection width increased, the contact start flying height increases. When the projection width is not less than about 20 μm, the contact start flying height exhibits a saturation tendency. This indicates that as the projection width increases, a contact area or a meniscus area increases to increase a frictional force, or the lubricant on the contact interface is less likely to move to the groove portion, whereby the effect of reducing the contact start flying height disappears. It is considered from the above result that preferably, the projection width is about 20 μm or less. However, it is also necessary to take into consideration the combination of the projection width and, the trimming width, the number of projections, or the groove width.

Figure 13:
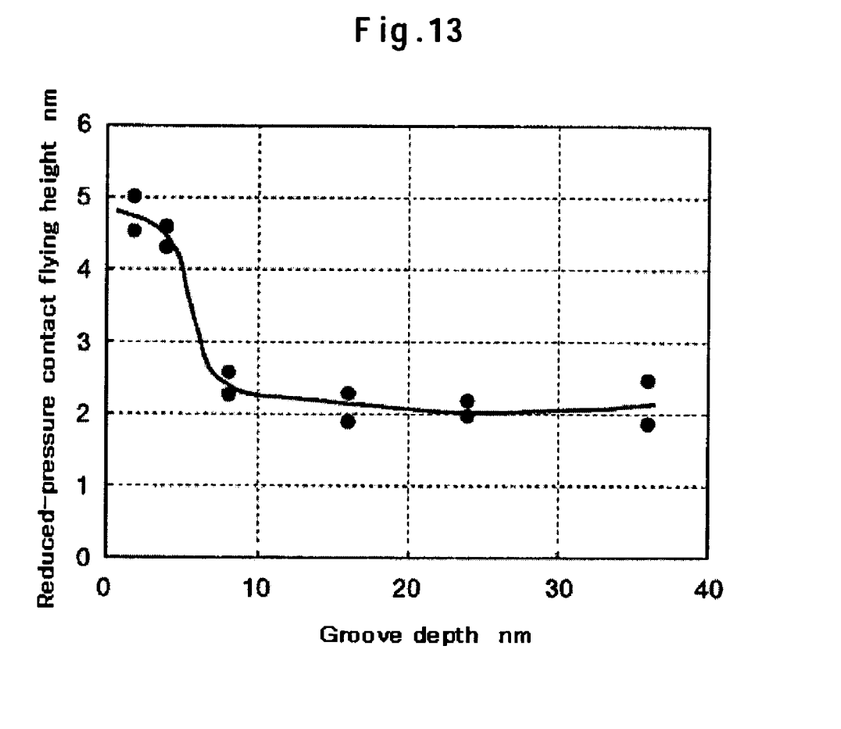
FIG. 13 is a diagram showing a relationship between the groove depth and the contact start flying height.

It is probable that the flying height reducing effect depends on the groove depth. In view of this, the contact start flying height was measured while the groove depth was varied to 2, 4, 8, 16, 24 and 36 μm. The projection width was 2 μm, the groove width was 4 μm, and the projection number was 7. FIG. 13 shows the results. The contact start flying height is reduced to about 2 nm when the groove depth is about 5 nm or more. This results show that the groove depth is preferably about 5 nm or more.

Figure 14:
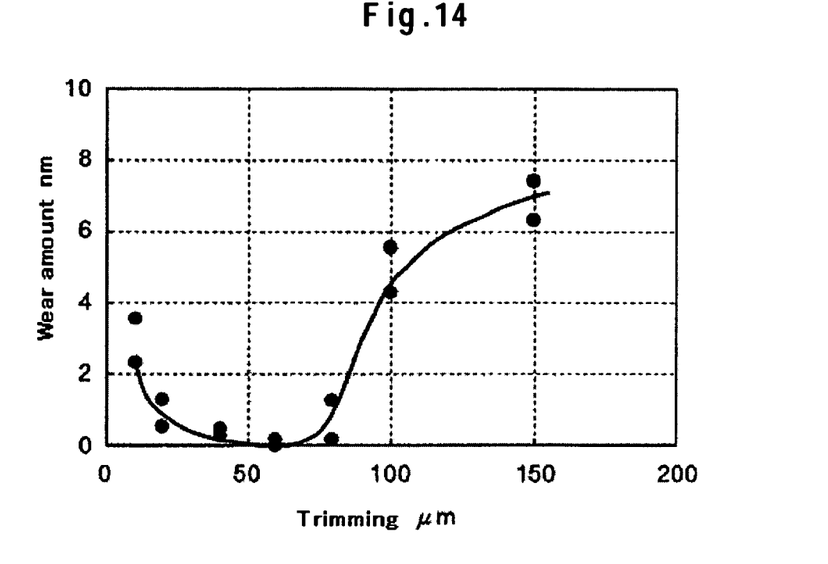
FIG. 14 is a diagram showing a relationship between the trimming width of a trimmed part and the wear amount of the slider.

It is probable that also the contact area or meniscus is changed depending on the trimming width of the flying height reducing portion 5. In view of this, the wear of the outflow end after a seek test has been carried out with the trimming width taken as a parameter was compared. In the seek test, the seek is repeated for 500 hours at a temperature of 60° C. with the slider flying height being 6 nm at a disk inner peripheral position. The wear of the slider was measured using AFM. The combinations of the trimming width, projection width, groove width and the projection number are (150 μm, 2 μm, 4 μm, 21), (100 μm, 2 μm, 4 μm, 13), (80 μm, 2 μm, 4 μm, 10), (60 μm, 2 μm, 4 μm, 7), (40 μm, 2 μm, 4 μm, 4), (20 μm, 2 μm, 4 μm, 1), (10 μm, 2 μm, 2 μm, 1). FIG. 14 shows the results. When the trimming width is as small as 10 μm, the wear amount is large. Also when the trimming width is 100 μm or more, the wear amount is large. That is, it is understood that a suitable trimming width is an area ranging from about 20 to 80 μm.

In order to confirm that the magnetic head slider of the present embodiment has no problem as a component for a magnetic disk drive and is superior to that in Comparative Example 4, the magnetic head slider was combined with the magnetic disk whose surface roughness was Rp 2.0 nm to constitute the magnetic disk drive. In addition, atmospheric pressure at which an error occurred was checked with the environment of the device reduced in pressure. The nominal flying height of the magnetic head slider is 9 nm. The error was checked such that after a signal was recorded on the whole disk surface at constant atmospheric pressure, the signal of the whole surface was reproduced. When the signal is recorded, heat is generated due to a recording current, and a recording element projects toward the magnetic disk in a deformable manner. Therefore, the flying height on the outflow side further lowers. This phenomenon is generally called thermal protrusion, which is one factor impeding the flying reliability of the magnetic head slider. As a result of test, an error generating atmospheric pressure in Comparative Example 4 was 0.75, whereas in the embodiment, it was 0.55. The above results show that the magnetic disk drive using the magnetic head slider according to the embodiment is large in reliability with respect to the variation in atmospheric pressure and the thermal protrusion.

Figure 15:
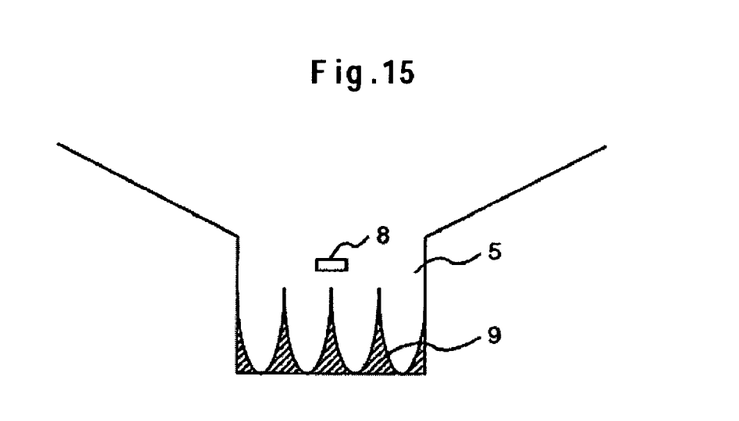
FIG. 15 is a plan view of an outflow end pad according to another embodiment.
Figure 16:
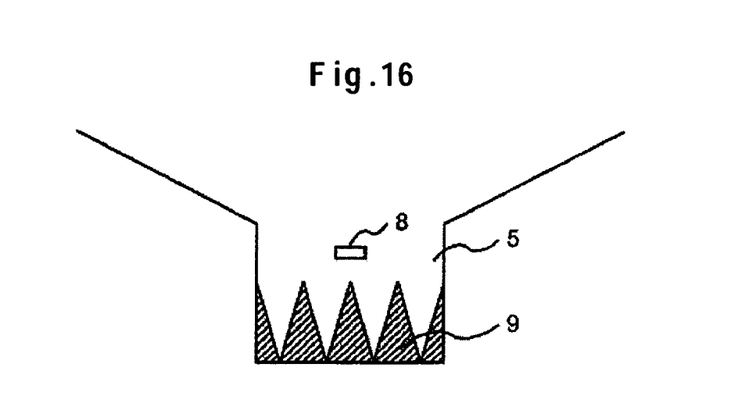
FIG. 16 is a plan view of an outflow end pad according to another embodiment.
Figure 17:
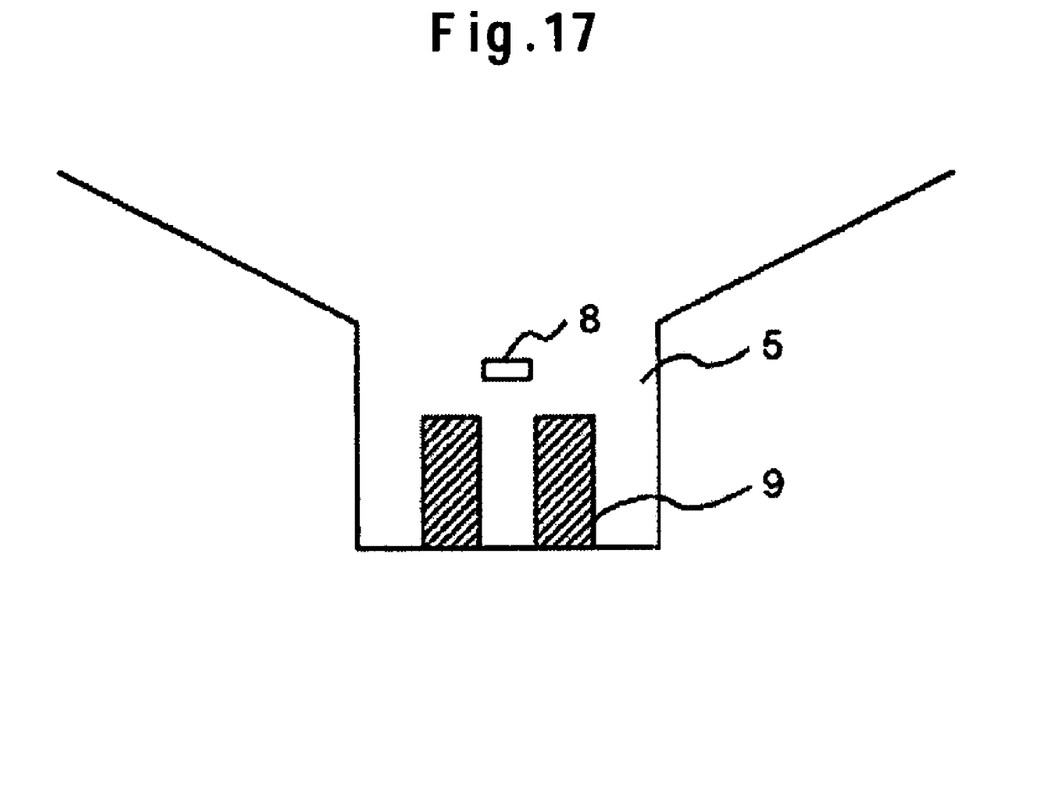
FIG. 17 is a plan view of an outflow end pad according to still another embodiment.
Figure 18:
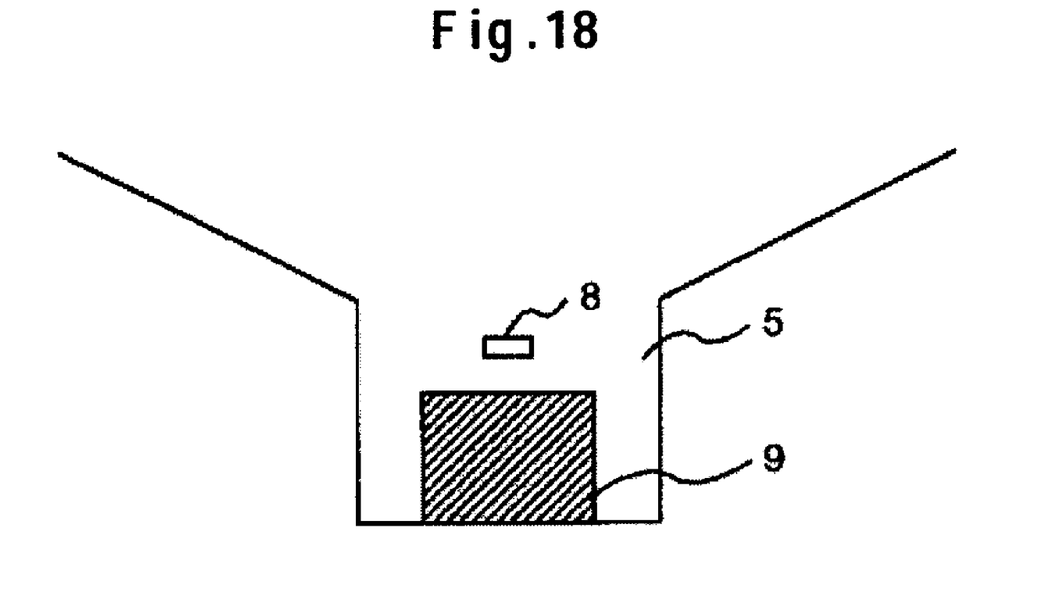
FIG. 18 is a plan view of an outflow end pad according to yet another embodiment.

The above-described embodiment shows the groove portion linearly extending in the length direction of the slider. However, it could be conceived that a circular arc groove portion is formed as shown in FIG. 15, a triangular groove portion is formed as shown in FIG. 16, the number of projections is small as shown in FIG. 17, or only one groove is formed as shown in FIG. 18. In these cases, it is easily presumed that the projection width, groove width, trimming width, and groove depth are optimized to enable obtaining the reducing effect of the contact start flying height and the reducing effect of the frictional force. Further, even if a hole is formed extending in the length direction of the slider, the effect similar to that mentioned above is obtained.

The magnetic head slider according to the above-described embodiment is combined with a super-smooth magnetic disk to enable lowering the contact start flying height of the magnetic head slider, thus providing a magnetic disk drive with a high degree of reliability.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider comprising:
an inflow shallow groove part provided on a surface facing a medium;
a plurality of air bearing rails or pads configured to generate an air bearing force, provided on the surface facing the medium; and
a magnetic head provided in an air bearing rail or pad, of said plurality of air bearing rails or pads, on a side of an air outflow end;
wherein an area in which a groove portion including a plurality of grooves extending in an air outflow direction of the air bearing rail or pad provided with said magnetic head, is formed closer to the medium and is provided between said magnetic head and said air outflow end;
wherein a width of said air bearing rail or pad provided with said magnetic head is formed narrower in said area in which said groove portion is formed on the side of said air outflow end.

2. A magnetic head slider according to claim 1, wherein said area in which said groove portion is formed is provided such that the air bearing rail or pad provided with said magnetic head is extended to the air outflow end.

3. A magnetic head slider according to claim 1, wherein each of said plurality of grooves of said groove portion is linear.

4. A magnetic head slider according to claim 3, wherein a width of a projection between the plurality of grooves of the groove portion is not more than about 20 μm.

5. A magnetic head slider according to claim 3, wherein a depth of the plurality of grooves formed in the groove portion is not less than about 5 nm.

6. A magnetic head slider according to claim 1, wherein at least one groove of said plurality of grooves formed in the groove portion has a circular arc shape.

7. A magnetic head slider according to claim 1, wherein at least one groove of said plurality of grooves formed in the groove portion has a triangular shape.

8. A magnetic head slider according to claim 1, wherein a depth of the groove portion is not less than about 5 nm.

9. A magnetic head slider according to claim 1, wherein a width of said area in which said groove portion is formed is about 20 to about 80 μm.

10. A magnetic head slider comprising:
   a tapered or stepped part formed at an air inflow end on a surface facing a medium;
   an inflow end rail or pad formed on a side of an air outflow end away from said tapered or stepped part;
   a negative pressure generating groove formed on the side of the air outflow end away from said inflow end rail or pad;
   an outflow end rail or pad formed on the side of the air outflow end; and
   a magnetic head provided in said outflow end rail or pad of said slider; and
   a flying height reducing portion of said outflow end rail or pad formed with a groove extending along an air outflow direction provided between said magnetic head and the air outflow end of said slider;
   wherein a width of said outflow end rail or pad at said flying height reducing portion is narrower than a width of remaining portions of said outflow end rail or pad.

11. A magnetic head slider according to claim 10, wherein said flying height reducing portion is formed such that said outflow end rail or pad is extended to the air outflow end.

12. A magnetic head slider according to claim 10, wherein the groove of said flying height reducing portion is linear.

13. A magnetic head slider according to claim 12, wherein the flying height reducing portion is formed with a plurality of grooves extending along the air outflow direction, and wherein a width of a projection between the plurality of grooves is not more than about 20 μm.

14. A magnetic head slider according to claim 12, wherein the groove of said flying height reducing portion has a depth of not less than about 5 nm.

15. A magnetic head slider according to claim 10, wherein the groove of said flying height reducing portion has a circular arc shape.

16. A magnetic head slider according to claim 10, wherein the groove of said flying height reducing portion has a triangular shape.

17. A magnetic head slider according to claim 10, wherein the groove of said flying height reducing portion has a depth of not less than about 5 nm.

18. A magnetic head slider according to claim 10, wherein a width of a region in which said groove is formed is about 20 to about 80 μm.

* * * * *

UNITED STATES PATENT AND TRADEMARK OFFICE
CERTIFICATE OF CORRECTION

PATENT NO. : 7,525,766 B2  Page 1 of 1
APPLICATION NO. : 11/060847
DATED : April 28, 2009
INVENTOR(S) : Tani

It is certified that error appears in the above-identified patent and that said Letters Patent is hereby corrected as shown below:

<u>In the Claims</u>:

Claim 10, column 9, line 23, please delete "and".

Signed and Sealed this

Thirtieth Day of June, 2009

JOHN DOLL
*Acting Director of the United States Patent and Trademark Office*